(12) United States Patent
Tasaki et al.

(10) Patent No.: US 6,895,006 B1
(45) Date of Patent: May 17, 2005

(54) UNICAST/MULTICAST SYSTEM

(75) Inventors: Yuuichi Tasaki, Tokyo (JP); Kazuhiko Isoyama, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 752 days.

(21) Appl. No.: 09/676,559

(22) Filed: Oct. 2, 2000

(30) Foreign Application Priority Data

Oct. 1, 1999 (JP) .......................................... 11-281549

(51) Int. Cl.⁷ .............................................. H04L 12/28
(52) U.S. Cl. .................. 370/390; 370/392; 370/395.31
(58) Field of Search ................................ 370/270, 351, 370/389, 390, 392, 395.1, 398, 395.2, 395.3, 395.31, 395.32, 412, 417, 418, 428, 429

(56) References Cited

U.S. PATENT DOCUMENTS 5,267,235 A * 11/1993 Thacker ...................... 370/396
6,115,379 A * 9/2000 Flanders et al. ............. 370/392
6,212,182 B1 * 4/2001 McKeown ................... 370/390
6,349,097 B1 * 2/2002 Smith ......................... 370/390

FOREIGN PATENT DOCUMENTS

| JP | A 5-136814  | 6/1993 |
| JP | A 5-236011  | 9/1993 |
| JP | A 8-251173  | 9/1996 |
| JP | A 9-93257   | 4/1997 |
| JP | A 10-190663 | 7/1998 |

* cited by examiner

*Primary Examiner*—John Pezzlo
*Assistant Examiner*—D Levitan
(74) *Attorney, Agent, or Firm*—Harrity & Snyder, L.L.P.

(57) ABSTRACT

A unicast/multicast system has an internal cell generating section that generates an internal cell to include its output index information based on user data, and an output port conversion table that stores the relation of output index information and output port number for the internal cell in the form of one-to-one for the unicast and one-to-multiple for the multicast.

7 Claims, 6 Drawing Sheets

FIG.5

OUTPUT PORT NUMBER

| KIND OF INDEX INFORMATION | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|
| 001$_H$ | 0 | 0 | 0 | 0 | 0 | 0 | 0 | 0 | 0 | 0 | 0 | 0 | 0 | 0 | 0 | 1 | ⎫ |
| 002$_H$ | 0 | 0 | 0 | 0 | 0 | 0 | 0 | 0 | 0 | 0 | 0 | 0 | 0 | 0 | 1 | 0 | |
| 003$_H$ | 0 | 0 | 0 | 0 | 0 | 0 | 0 | 0 | 0 | 0 | 0 | 0 | 0 | 1 | 0 | 0 | |
| 004$_H$ | 0 | 0 | 0 | 0 | 0 | 0 | 0 | 0 | 0 | 0 | 0 | 0 | 1 | 0 | 0 | 0 | FOR UNICAST |
| 005$_H$ | 0 | 0 | 0 | 0 | 0 | 0 | 0 | 0 | 0 | 0 | 0 | 1 | 0 | 0 | 0 | 0 | |
| 006$_H$ | | | | | | | | | | | | | | | | | |
| 00F$_H$ | 1 | 0 | 0 | 0 | 0 | 0 | 0 | 0 | 0 | 0 | 0 | 0 | 0 | 0 | 0 | 0 | ⎭ |
| 010$_H$ | 0 | 0 | 0 | 0 | 0 | 0 | 0 | 0 | 0 | 0 | 0 | 0 | 0 | 0 | 1 | 1 | ⎫ |
| 011$_H$ | 0 | 0 | 0 | 0 | 0 | 0 | 0 | 0 | 0 | 0 | 0 | 0 | 0 | 1 | 0 | 1 | |
| 012$_H$ | 0 | 0 | 0 | 0 | 0 | 0 | 0 | 0 | 0 | 0 | 0 | 0 | 1 | 0 | 0 | 1 | FOR MULTICAST |
| . | | | | | | | | | | | | | | | | | |
| FFF$_H$ | | | | | | | | | | | | | | | | | ⎭ |

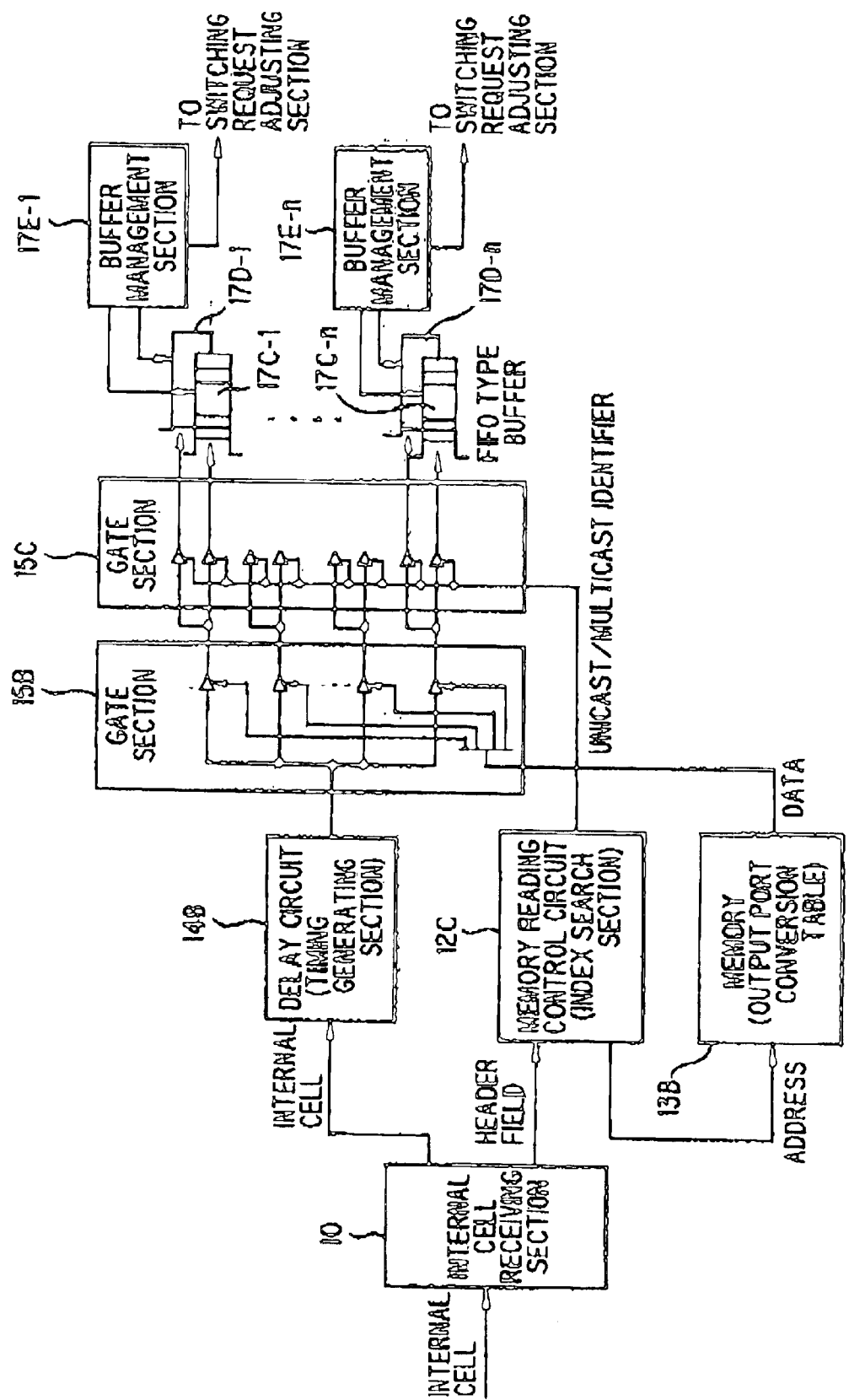

US 6,895,006 B1

UNICAST/MULTICAST SYSTEM

FIELD OF THE INVENTION

This invention relates to a system for unicasting or multicasting IP packets, ATM cells etc.

BACKGROUND OF THE INVENTION

As a switch for processing a multicast cell, for example, Japanese patent application laid-open No.9-162879 (1997) discloses a shared buffer type ATM. This ATM switch has address buffers provided for its output ports, respectively. The multicast is conducted by sequentially transferring the address pointer of a shared buffer where a multicast cell is stored. Also, the ATM switch needs to be provided with a counter for confirmation of the number of broadcast to be decremented every time a multicast cell is output.

However, the ATM switch has problems below.

The first problem is that it is necessary to provide a large amount of the buffer for multicast so as to cope with a case that the ratio of multicast calls in traffic increases.

The second problem is that it may cause the lowering of throughput since the subsequent multicast processing cannot be run before the counter for confirmation of the number of broadcast becomes zero.

SUMMARY OF THE INVENTION

Accordingly, it is an object of the invention to provide a unicast/multicast system that allows a unicast cell and a multicast cell to be processed in the same circuit.

According to the invention, a unicast/multicast system, comprises: comprises:

an internal cell generating section that generates an internal cell based on user data;

an internal cell receiving section that outputs the internal cell to a timing generating section and outputs a header field of the internal cell to an index search section;

an output port conversion table that stores the relation of output index information and output port number in the form of one-to-one for the unicast and one-to-multiple for the multicast;

the index search section that extracts output index information from the header field to be sent from the internal cell receiving section, refers to the output port conversion table for an output port number corresponding to the output index information extracted, and outputs the output port number obtained from the output port conversion table to a destination-based distribution section;

the destination-based distribution sections that controls a gate section based on the output port number input from the index search section;

a timing generating section that delays the internal cell input from the internal cell receiving section and then outputs it the gate section;

the gate section that distributes the internal cell input from the timing generating section to the gate section according to the control of the destination-based distribution section;

a plurality of buffers that each store the internal cell distributed from the gate section and, when receiving the internal cell distributed from the gate section, sends switching request signal to a switching request adjusting section;

the switching request adjusting section that adjusts the switching request signal input from the buffers between the buffers and determines a route in a crosspoint switch; and the crosspoint switch that outputs the internal cell stored in the buffers through the route determined by the switching request adjusting section.

BRIEF DESCRIPTION OF THE DRAWINGS

The invention will be explained in more detail in conjunction with the appended drawings, wherein:

FIG. 5 is a table showing the content of a memory 13B in FIG. 4;

FIG. 6 is a block diagram showing the composition of a unicast/multicast system in a second preferred embodiment according to the invention.

DESCRIPTION OF THE PREFERRED EMBODIMENT

Figure 1:
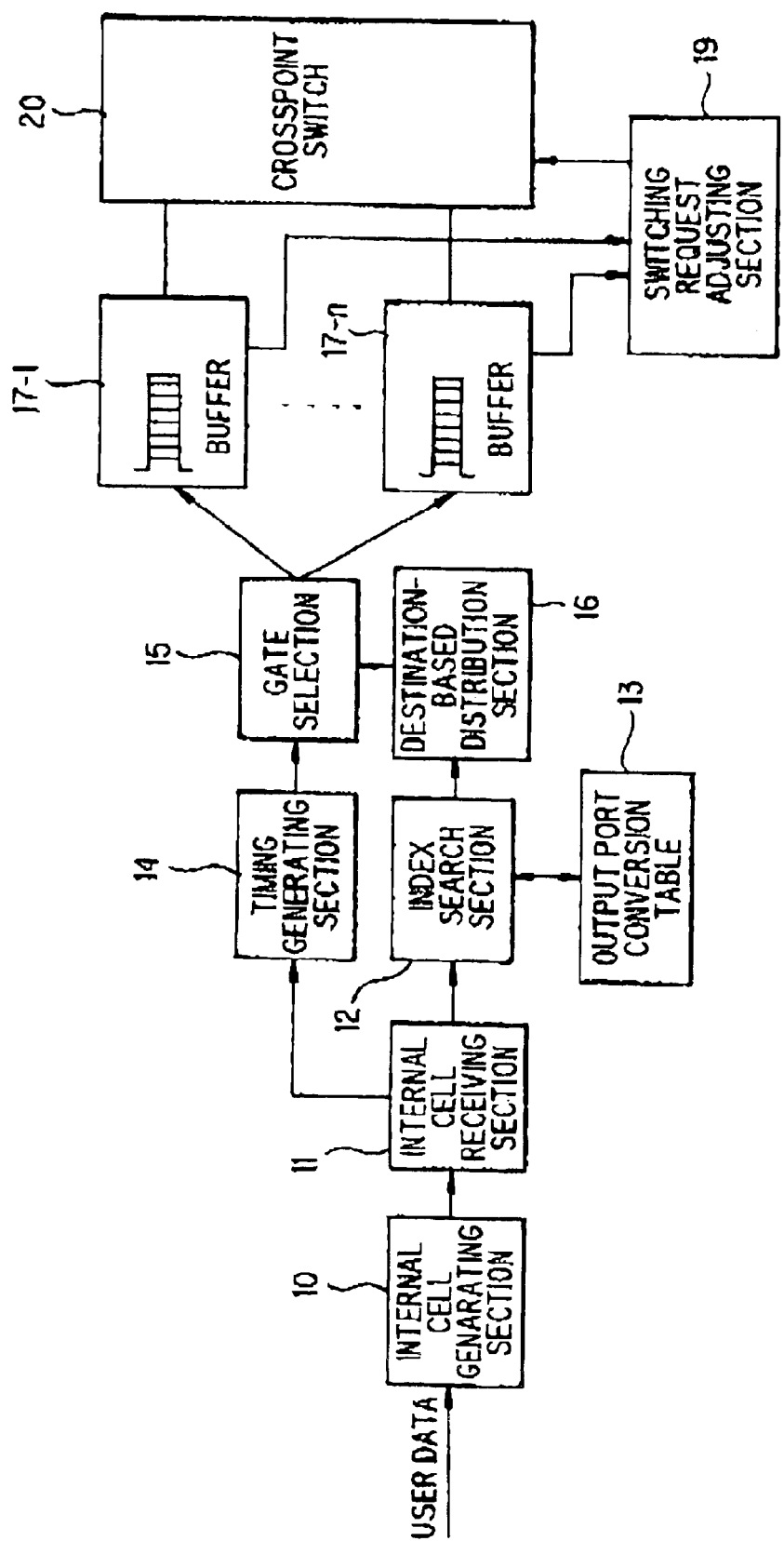
FIG. 1 is a block diagram showing the schematic composition of a unicast/multicast system in a preferred embodiment according to the invention.

The preferred embodiments of the invention will be explained below, referring to the drawings.

FIG. 1 is a block diagram showing the schematic composition of a unicast/multicast system according to the invention. In FIG. 1, 10 is an internal cell generating section to generate a cell (hereinafter referred to internal cell) with a fixed length and a specific format dedicated to switching, based on user data such as IP packet (Internet protocol), ATM (asynchronous transfer mode) cell etc. 11 is an internal cell receiving section that has a function to extract a header field from the internal cell. 12 is an index search section to get output port information corresponding to output index information included in the header field by referring to an output port conversion table 13. 13 is the table to store multiple index information and multiple output port number information in the form of one-to-one for the unicast and one-to-multiple for the multicast. 14 is a timing generating section to make the output of internal cell delay a predetermined time. 15 is a gate section that functions as a route to buffers 17-1 to 17-n to store the internal cell. 16 is a destination-based distribution section that controls the gate section 15 according to the output port information. 17-1 to 17-n are the FIFO (first-in first-out) type buffers that are provided for output ports, respectively, and store the internal cell for corresponding one of the output ports. Optionally, the buffers 17-1 to 17-n may be divided into buffers for the unicast and buffers for the multicast. 19 is a switching request adjusting section that controls a crosspoint switch 20 according to a switching request from the buffers 17-1 to 17-n.

Figure 2:
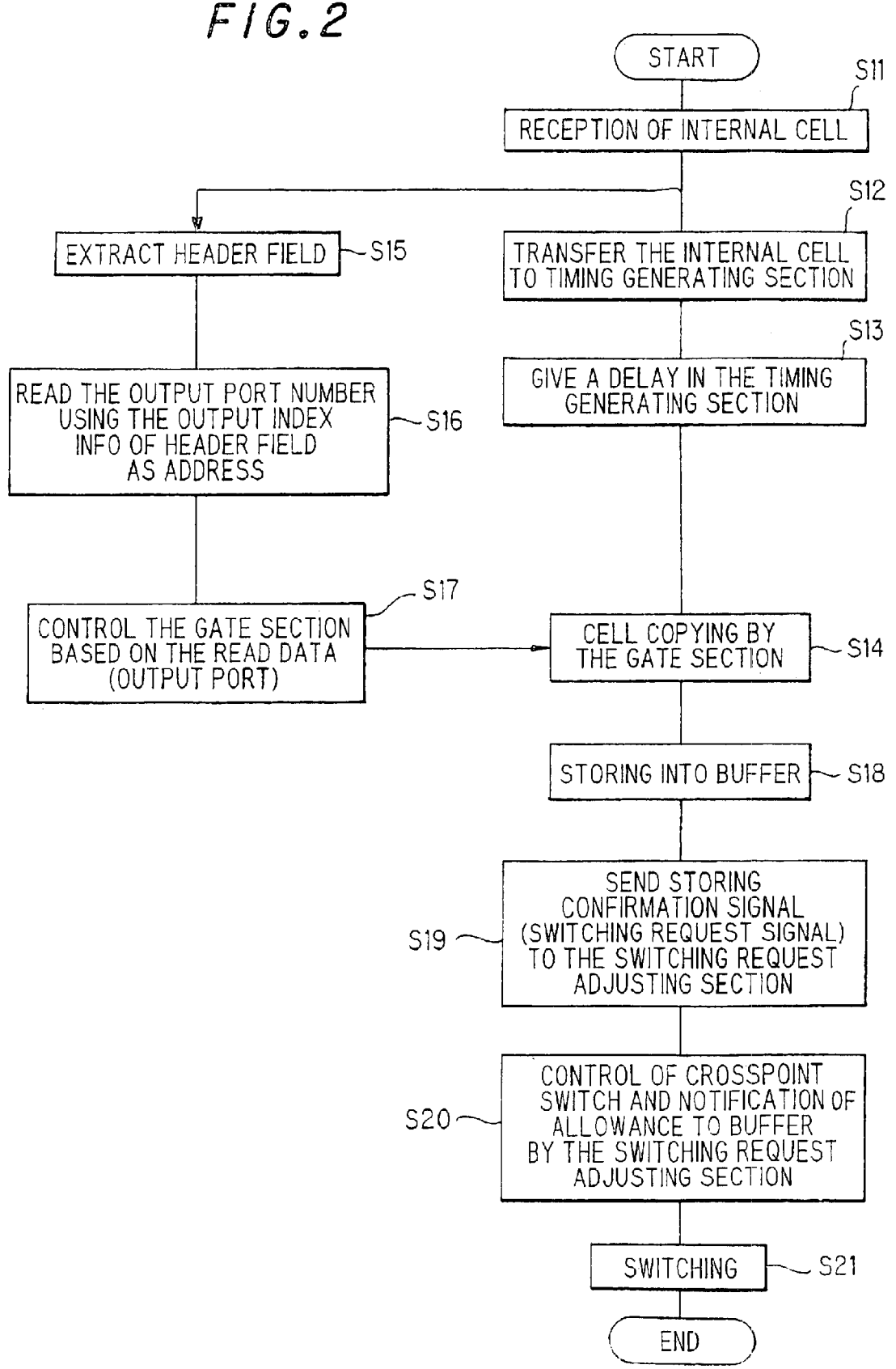
FIG. 2 is a flow chart showing the operation of the unicast/multicast system in FIG. 1.
Figure 3:
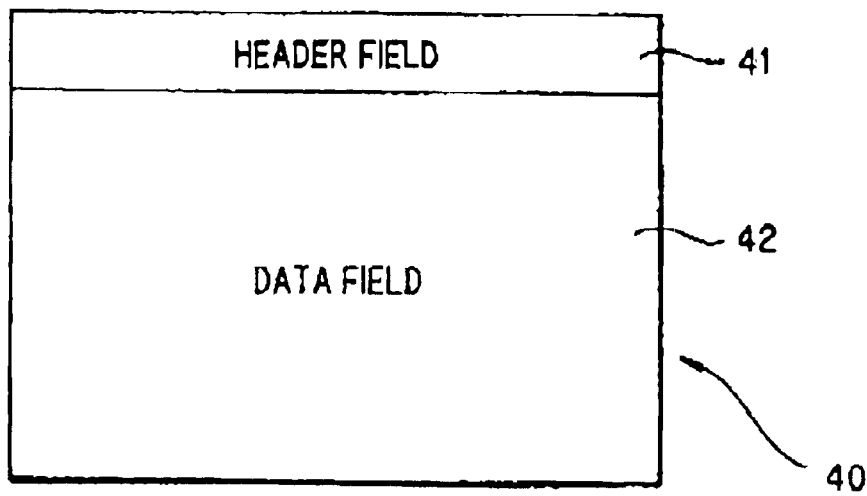
FIG. 3 is a format diagram showing an internal cell used in the unicast/multicast system in the embodiment of the invention.

Referring to FIGS. 1, 2 and 3, the operation of the unicast/multicast system explained above will be explained below.

The internal cell generating section 10 converts global user data such as IP packet and ATM cell into internal cell. As shown by a format diagram in FIG. 3, an internal cell 40 is composed of a header field 41 and a data field 42. The header field 41 stores destination information such as VPI/VCI (virtual path identifier/virtual channel identifier) etc. that is converted into particular and simple form so that the internal cell is correctly subject to the switching inside the unit. The data field 42 stores the original user data. The internal cell receiving section 11 receives the internal cell 40 (step S11). Then, the internal cell receiving section 11 sends the header field 41 of the received internal cell 40 to the index search section 12, and sends the entire internal cell 40 to the timing generating section 14 (step S12). The index search section 12 extracts output index information from the header information of the header field 41 (step S15). After extracting the output index information of the header field 41, the index search section 12 gets output port number by referring to the output port conversion table 13 (step S16). The index search section 12 sends the obtained output port number to the destination-based distribution section 16. The destination-based distribution section 16 controls the gate section 15 according to the output port number received from the index search section 12 (step S17). In this case, when only one output port number is obtained, the gate to one output port opens, and when multiple output port numbers are obtained, the gates to multiple output ports open. On the other hand, the timing generating section 14 makes the internal cell sent to the timing generating section 14 delay the predetermined time that is necessary for the index search section 12 to search the output port number and for the destination-based distribution section 16 to control the gate section 15 (step S13). After the route of gate section 15 is determined, the internal cell is stored, through the gate section 15, into a specific buffer 17-$i$ ($1 \leq i \leq n$) corresponding to the output port in case of the unicast, and into multiple buffers 17-$i_1$, ..., 17-$i_m$ ($i_1 \geq 1$ and $i_m \leq n$) in case of the multicast (step S14, S18). After the internal cell is stored in the buffer 17·i or buffers 17-$i_1$, ..., 17-$i_m$, the buffer 17-$i$ or buffers 17-$i_1$, ..., 17·$i_m$ sends the switching request to the switching request adjusting section 19 (step S19). The switching request adjusting section 19 conducts fairly the adjustment to the switching request received from the multiple buffers 17-1 to 17-$n$ in a unit time, and determines the route of the crosspoint switch 20 (step S20). The crosspoint switch 20 establishes the route to pass the internal cell based on the route information from the switching request adjusting section 19, and conducts the switching of the internal cell (step S21).

First Embodiment

Figure 4:
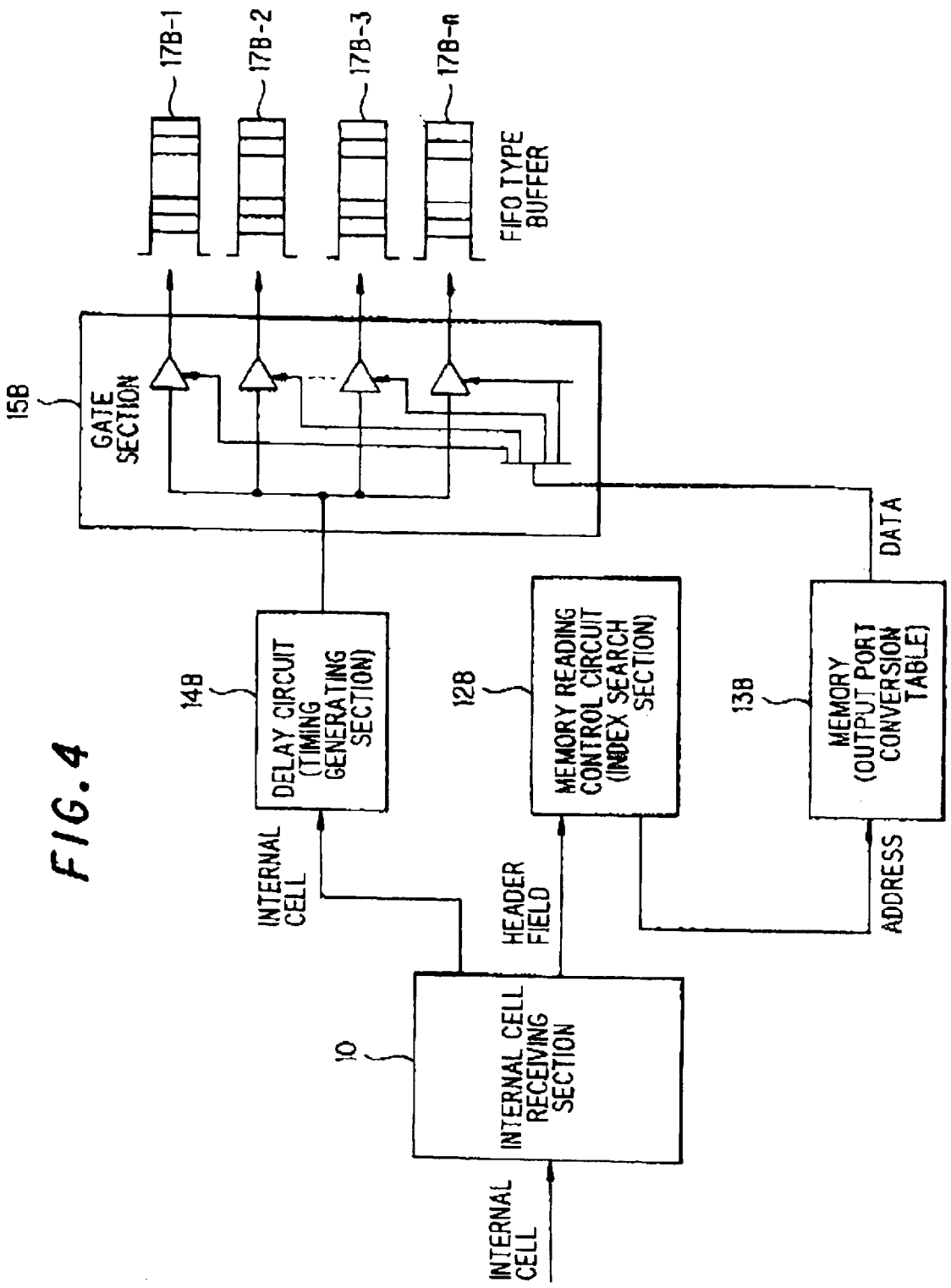
FIG. 4 is a block diagram showing the composition of a unicast/multicast system in a first preferred embodiment according to the invention.

A unicast/multicast system in the first preferred embodiment according to the invention will be explained below, referring to FIGS. 4 and 5.

In this embodiment, as the output port conversion table 13, a memory 13B such as RAM (random access memory) or ROM (read-only memory) is used. In this case, the output index information to be extracted by a memory reading control circuit 12B to function as the index search section 12 corresponds to an address of the memory 13B, and the output port number corresponds to data to be written in each address of the memory 13B. Also, the memory 13D also functions as the destination-based distribution section 16. The output port number is stored in the form of bit pattern so as to facilitate the control of the gate section 15B. In case of the bit pattern form, the number n of ports corresponds to the data width of the memory 13B. Therefore, when a complete unicast region is, in advance, made using a memory of wide data width, it can cope with even such a case that the number n of ports increases, by adding bit pattern information for the multicast to the memory 13B.

FIG. 5 shows an example of the content of the memory 13B in a case that there are 4095 ($\approx 2^{12}$-1) types of output index information and there are 16 output ports. According to need, the output index information can be expanded to 65535 ($\approx 2^{16}$-1) types. The address range of 000H to 00FH is used for the unicast, and the address range of 010H to FFFH is used for the multicast. In this way, bit patterns of "1" for only one bit are used for the unicast, and bit patterns of "1" for multiple bits are used for the multicast. Therefore, by using the composition and operation for the multicast, the unicast can be also handled.

When the memory reading control circuit 12B receives a header field from the internal cell receiving section 10, it extracts the output index information from the header field and then conducts the read operation to the memory 13B using the extracted output index information as address. In reply to this, the memory 13B outputs, as output port number, data corresponding to the output index information ($\approx$memory address). The gate section 15B allows a buffer corresponding to a bit with "1" of the data output from the memory 13B to be enabled.

On the other hand, an internal cell sent to a delay circuit 14B is delayed in the delay circuit 14B during the processing time required to determine the route of the gate section 15B. After the internal route of the gate section 15B is determined, the internal cell is output from the delay circuit 14, passing through the enabled buffer of the gate section 15B, written into only a FIFO type buffer corresponding to the enabled buffer. In case of the multicast, they are written into multiple FIFO buffers of the FIFO buffers 17-1 to 17-$n$, and in case of the unicast, it is written into one FIFO buffer of the FIFO buffers 17-1 to 17-$n$.

Second Embodiment

In the second preferred embodiment of the invention, even in a case that a multicast cell is desired to be subject to the priority switching, it is nor necessary to provide separate circuits for the unicast and multicast in an existing circuit composition.

Figure 7:
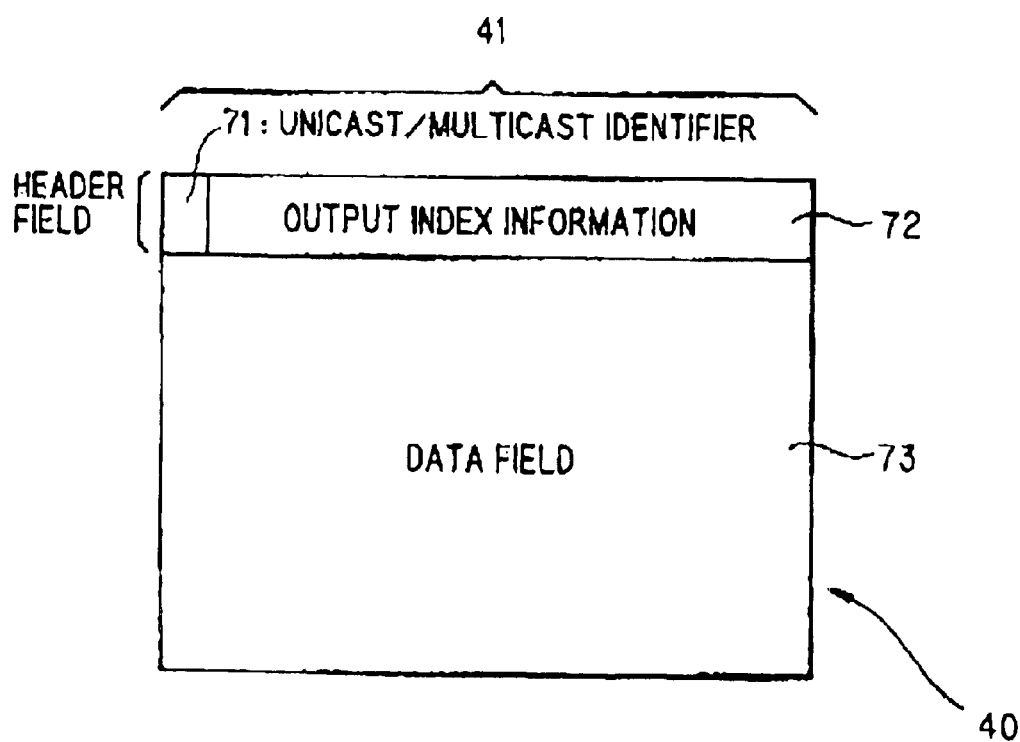
FIG. 7 is a format diagram showing an internal cell used in the unicast/multicast system in FIG. 6.

Referring to FIGS. 6 and 7, the second embodiment will be explained below.

FIFO buffers 17C-1 to 17C-n are provided for output ports, respectively, and FIFO buffers 17D-1 to 17D-n are provided for output ports, respectively. The FIFO buffers 17C-1 to 17C-n are provided for the unicast, and the FIFO buffers 17D-1 to 17D-n are provided for the multicast. Also, a FIFO buffer 17C-1 and a FIFO buffer 17D-i are provided for an i-th output port. The gate section 15B is the same as that in the first embodiment. Agate section 15C in the second embodiment is an additional gate, and allows an internal cell passed through the gate section 15B to be alternatively supplied to either FIFO 17C-i for the unicast or FIFO 17D-i for the multicast. The internal cell receiving section 10, memory 13B and delay circuit 14 are the same as those in the first embodiment.

FIG. 7 shows the format of internal cell used in the second embodiment. In FIG. 7, an internal cell 40 used in the second embodiment is provided with a unicast/multicast identifier 71 and output index information 72 in header field 41. Similarly to the first embodiment, global user data such as IP packet and ATM cell are stored in data field 73.

When the internal cell receiving section 10 receives an internal cell, it extracts the header field of the internal cell and sends it to the memory reading control circuit 12C. Then, the memory reading control circuit 12C outputs the unicast/multicast identifier 71 of the header field to the gate section 15C, and outputs the output index information 72 thereof to the memory 13B. The memory 13B outputs, similarly to the first embodiment, a bit pattern corresponding to the output index information. The gate section 15B allows, similarly to the first embodiment, a buffer corresponding to a bit with "1" of the output bit pattern to be enabled. The gate section 15C allows a buffer corresponding to a FIFO buffer 17C-i for the unicast or a FIFO buffer 17D-i for the multicast to be enabled, according to the value of the unicast/multicast identifier 71. On the other hand, like the first embodiment, the internal cell sent from the internal cell receiving section 10 to the delay circuit 14B is delayed in the delay circuit 14B during a predetermined time, then passed through the enabled buffer of the gate section 15B. Then, if the unicast is designated by the unicast/multicast identifier 71, the internal cell passed through the enabled buffer of the gate section 15B is passed through a buffer of the gate section 15C corresponding to a FIFO buffer 17C-i for the unicast and written into the FIFO buffer 17C-i for the unicast. If the multicast is designated by the unicast/multicast identifier 71, the internal cell is passed through buffers of the gate section 15C corresponding to FIFO buffers 17D-i for the multicast and written into the FIFO buffers 17D-i for the multicast. Buffer management sections 17E-1 to 17E-n monitor the existence of internal cell stored in the FIFO buffers 17C-1 to 17C-n and 17D-1 to 17D n. When it detects that the internal cell is stored in any of the FIFO buffers, it sends the switching request to the switching request adjusting section 19. When the transfer allowance to the crosspoint switch is issued from the switching request adjusting section 19, if there is stored a multicast cell, the buffer management sections 17E-1 to 17E-n transfers, by priority, the multicast cell to the crosspoint switch.

Advantages of the Invention

First, since a unicast cell is similarly handled in the particular form of multicast cell, separate circuits for unicast cell and multicast cell is not necessary. Therefore, the processing circuit can be simplified.

Second, although the conventional system needs to be provided with separate buffers for the storing inside the system since the unicast cell and multicast cell are processed therein separately, in this invention the buffers for the multicast are not needed since the multicast cell is processed like the unicast cell.

Third, even when it is used with a crosspoint switch having no multicast function (=being not able to connect simultaneously to multiple routes), the multicast can be achieved.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A unicast/multicast system, comprising:
   an internal cell generating section that generates an internal cell based on user data;
   an internal cell receiving section that outputs the internal cell to a timing generating section and outputs a header field of the internal cell to an index search section;
   an output port conversion table that stores the relation of output index information and output port number in the form of one-to-one for the unicast and one-to-multiple for the multicast;
   said index search section that extracts output index information from the header field to be sent from said internal cell receiving section, refers to said output port conversion table for an output port number corresponding to the output index information extracted, and outputs the output port number obtained from said output port conversion table to a destination-based distribution section;
   said destination-based distribution section that controls a gate section based on the output port number input from said index search section;
   a timing generating section that delays the internal cell input from said internal cell receiving section and then outputs it said gate section;
   said gate section that distributes the internal cell input from said timing generating section to said gate section according to the control of said destination-based distribution section;
   a plurality of buffers that each store the internal cell distributed from said gate section and, when receiving the internal cell distributed from said gate section, sends switching request signal to a switching request adjusting section;
   said switching request adjusting section that adjusts the switching request signal input from said buffers between said buffers and determines a route in a crosspoint switch; and
   said crosspoint switch that outputs the internal cell stored in said buffers through the route determined by said switching request adjusting section.

2. A unicast/multicast system, according to claim 1, wherein:
   said output port conversion table is a memory to an address of which the output index information is assigned, data stored in the address being represented as a bit pattern and corresponding to an output port number.

3. A unicast/multicast system, according to claim 1, wherein:
   said buffers have buffers for the unicast and buffers for the multicast assigned to one output port number;
   said header section has a unicast/multicast identifier in addition to the output index information;
   said destination-based distribution section controls said gate section based on the unicast/multicast identifier as well as the output index information; and
   said gate section distributes the internal cell input from said timing generating section to the unicast buffer or multicast buffer designated by said destination-based distribution section.

4. A unicast/multicast system, according to claim 3, further comprising:
   a buffer management section that, if there is stored an internal cell in the multicast buffer when the transfer allowance is issued from said crosspoint switch, transfers, by priority, the internal cell in the multicast buffer to the crosspoint switch.

5. A unicast/multicast system, according to claim 1, wherein:
   said user data is of IP packet or ATM cell.

6. A unicast/multicast system, according to claim 1, wherein:
   said buffers each are of a FIFO type buffer.

7. A combined unicast and multicast system, comprising:
   plural data output ports connected to output data toward an input side of a crosspoint switch, each of the plural data output ports designated by an output port number, an internal cell generating section to i) receive an original user data in a format, and ii) generate, from user data destination information within the accepted original user data, an internal cell comprising a header field added to the original user data, the header field comprising output port index information indexing the user data destination information to one of the output ports when the data is unicast and to plural of the output ports when the data is multicast, the internal cell generating section having a first output that outputs the internal cell toward the plural data output ports and a second output that outputs the header field, and an output port conversion section connected to i) accept the header field from the second output, ii) extract the output port index information from the header field, and iii) determine output port numbers by using the extracted output port index information as an entry to a table providing a relationship between the output port index information and the output port numbers, wherein, entries of the table index to only one of the output ports when the data is unicast and to plural of the output ports when the data is multicast, the header field further comprises an identifier indicated whether the original user data is unicast or multicast, the output port conversion section extracts the identifier and, from the identifier, determines whether the original user data is unicast or multicast, and the plural data output ports comprise a first gate section of plural gates connected to a second gate section of plural gates, each of the gates of the first gate section connected to plural of the gates of the second gate section, the second gate section connected to a buffer section of plural buffers, each of the gates of the second gate section connected to one of the buffers, the buffers connecting to the crosspoint switch, a first set of the buffers dedicated for data that is unicast and a second set of the buffers dedicated for data that is multicast, the determined output port numbers from the table enabling selected ones of the gates of the first gate section to pass the original user data to the second gate section, and the extracted identifier enabling gates of the second gate section so that gates connected to the first set of buffers are enabled when the data is unicast and gates connected to the second set of buffers are enabled when the data is multicast.

* * * * *